United States Patent [19]
Casolo et al.

[11] 3,951,811
[45] Apr. 20, 1976

[54] MODULAR CONTAINER
[75] Inventors: Angelo J. Casolo, Columbia; Henry Handler, Brookeville, both of Md.
[73] Assignee: Almag Pollution Control Corporation, Baltimore, Md.
[22] Filed: June 27, 1974
[21] Appl. No.: 483,804

[52] U.S. Cl................................. 210/281; 210/282; 210/289
[51] Int. Cl.² .................... B01D 27/02; B01D 35/02
[58] Field of Search ............. 55/387, 388, 515, 518, 55/519; 210/281, 282, 289, 291, 210/274, 275, 293

[56] References Cited
UNITED STATES PATENTS

| | | | |
|---|---|---|---|
| 231,464 | 8/1880 | Willsey | 210/289 X |
| 1,223,460 | 4/1917 | Widner | 210/289 |
| 1,797,709 | 3/1931 | Apeldorn | 210/289 X |
| 1,917,121 | 7/1933 | Hughson | 210/282 X |
| 2,167,225 | 7/1939 | Van Eweyk | 210/289 X |
| 2,500,134 | 3/1950 | Murray | 210/281 |
| 2,630,227 | 3/1953 | Rodwell | 210/282 X |
| 2,686,596 | 8/1954 | Storms | 210/289 |
| 2,772,002 | 11/1956 | Mauro | 210/289 X |
| 2,802,573 | 8/1957 | Weatherly | 210/289 |
| 3,195,987 | 7/1965 | Hardison | 210/274 X |
| 3,339,737 | 9/1967 | Kiscellus et al. | 210/289 X |
| 3,342,340 | 9/1967 | Shindell | 210/289 X |
| 3,448,043 | 6/1969 | Vajna | 210/289 X |
| 3,529,726 | 9/1970 | Keenan | 210/282 X |
| 3,585,130 | 6/1971 | Gregory | 210/282 X |

FOREIGN PATENTS OR APPLICATIONS
796,917   6/1958   United Kingdom.................. 210/282

Primary Examiner—Frank A. Spear, Jr.
Assistant Examiner—Robert H. Spitzer
Attorney, Agent, or Firm—Morton J. Rosenberg

[57] ABSTRACT

A modular container which includes a housing frame containing particulate material through which contaminated liquid is passed for purposes of purification. The container includes flow distribution members which are secured within the housing frame for dispersing flow of the incoming contaminated liquid equally throughout the particulate material. Containment members formed of a fibrous material are bonded to the flow distribution members to constrain the particulate material within the housing frame. The containment members are porous to permit passage of the liquid therethrough but of sufficient density to retain the particulate material within a chamber of the housing frame. Upper and lower cover members are hermetically sealed to the housing frame and include conduits to permit insertion of contaminated liquid and egress of purified liquid after it has passed through the particulate material. Conduits are provided within the housing frame to provide means whereby the particulate material may be inserted or removed from the container. Positional placement members are additionally utilized to maintain the flow distribution and containment elements in relation to an internal wall surface of the housing frame.

15 Claims, 4 Drawing Figures

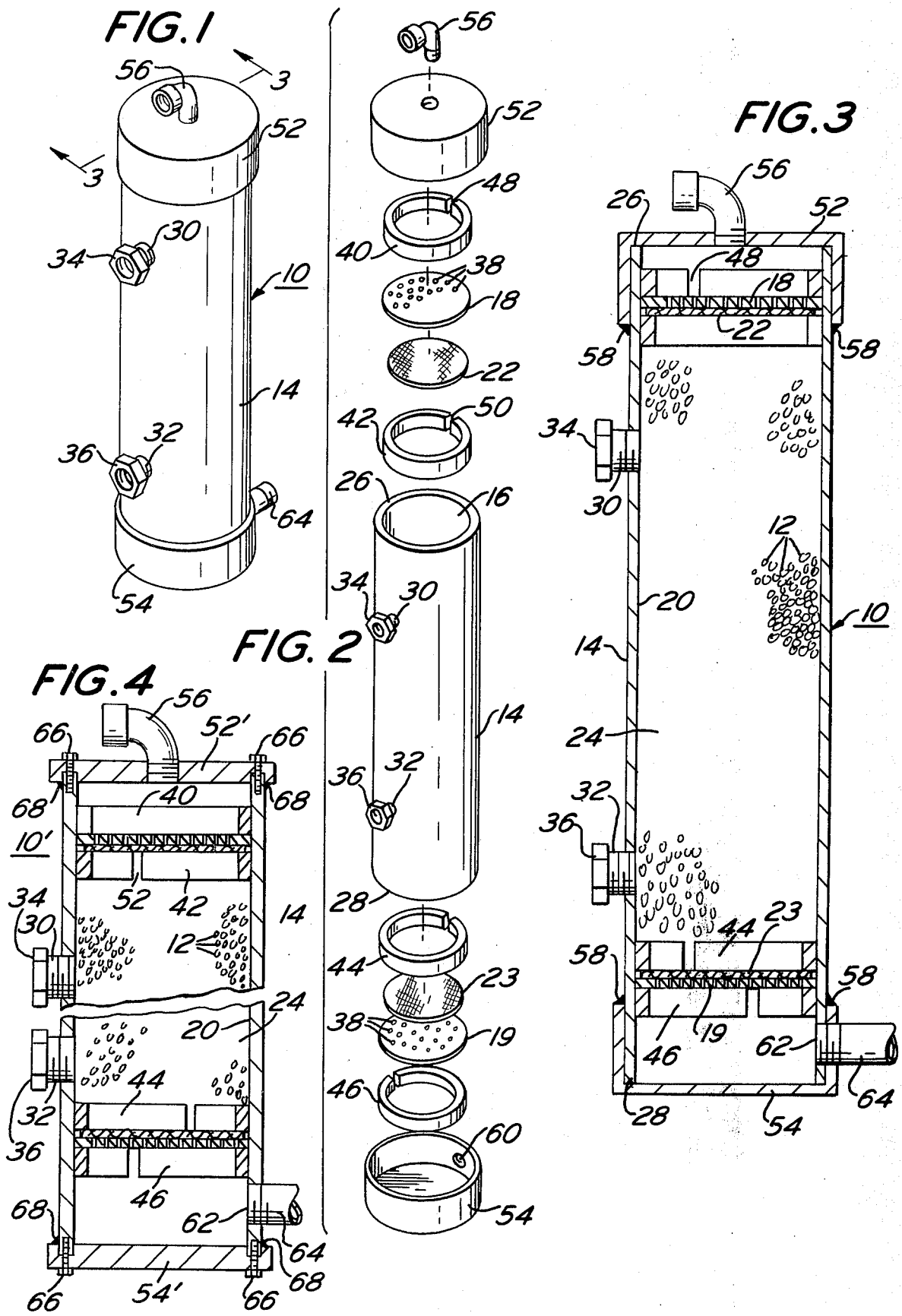

MODULAR CONTAINER

BACKGROUND OF THE INVENTION

1. Field of the Invention

This invention pertains to modular containers. In particular, this invention relates to modular containers containing particulate material where the containers are adapted to permit contaminated liquid to be passed through the particulate material for purposes of purification. More in particular, this invention relates to modular containers to be used in filtration as well as ion-exchange systems for purposes of water purification. Still further, this invention pertains to modular containers for use in various liquid purification processes where the container is formed of materials which are generally of low relative weight and substantially inert with respect to chemical reactions being formed therein.

2. Prior Art

Containers used as chemical reaction vessels in the treatment of contaminated liquids are known in the art. However, some prior systems rely on chemical induction and oxidation systems which require large container or tank storage capacities. When such systems are used, solid sludge disposal becomes unwieldy or the precipitates must be sorted and removed. Such systems are relatively expensive and large volume areas must be set aside which leads to wasted space considerations, thus providing increased liquid purification costs.

Other prior liquid purification systems rely on chemical deduction techniques. However, in such systems water recovery and reuse has generally been found to be impractical. Where water is the liquid being purified, such systems have been found to be extremely expensive in operation.

Other prior systems for treatment of industrial and commercial waste waters has been through reverse osmosis systems. However, the equipment in such prior systems generally requires very high pressure hydraulic pumping which dictates that the pumping equipment must be massive to service fairly minimal sized containers. Additionally, in such reverse osmosis type processes it has been found that such prior systems do not operate efficiently where a multiplicity of contaminating ions are found in the contaminated liquid. Thus, where a large variety of contaminating constitutents are included in the liquid to be purified, it has been found that reverse osmosis systems often do not provide for relatively pure liquid as an end product.

Other prior systems include ion-exchange structure housings which are generally large metal types having a multiplicity of auxiliary components. Such systems provided for relatively complex plumbing arrangements as well as unwieldy resin containers which has lead to massive space requirements. Such prior containers utilized in ion-exchange systems of this type provided for substantially high cost liquid purification. Additionally, due to the large size of prior containers used in such ion-exchange systems, it has generally been found that the containers were not replaceable and thus operating times of the systems were not optimized. Often, in such prior ion-exchange systems in-place regeneration of exhausted resins was necessarily part of the operating procedure. Such regeneration of the resin material provided for increased non-operating time of such prior systems thus resulting in higher costs for the liquid purification.

SUMMARY OF THE INVENTION

A modular container for capturing particulate material through which liquid passes. The modular container includes a housing frame having a through opening for passage of the liquid. Flow distribution members are secured to an inner surface of the housing frame for substantially equalizing flow of the liquid through the particulate material within the container independent of the particulate material positional location. Containment members bonded to the flow distribution members constrain the particulate material within a chamber of the housing frame. The containment members are formed of a fibrous material which is porous to provide passage of the liquid therethrough.

BRIEF DESCRIPTION OF THE DRAWINGS

FIG. 1 is a perspective view of the modular container;

FIG. 2 is a perspective exploded view of the modular container showing the elements of the container;

FIG. 3 is a sectional view of the modular container taken along the sectional line 3—3 of FIG. 1; and FIG. 4 is a section view of an embodiment of the modular container.

DESCRIPTION OF THE PREFERRED EMBODIMENTS

Referring now to the invention, there is shown in FIGS. 1, 2 and 3 modular container or liquid transport vessel 10 for maintaining particulate material 12 in secured positional location internal thereto. In overall concept, container 10 provides a mechanism whereby contaminated liquid may be introduced, passed through particulate material 12 and transported external to container 10 in a somewhat more purified state. In particular operation, modular container 10 has been utilized to hold particulate material 12 in filtration process systems. In such cases particulate material 12 may be sand, anthracite, or in other instances an adsorbing material such as activated carbon. Additionally, container 10 has been used to maintain particulate material 12 in ion exchange reactions where a plurality of containers 10 may be arranged in some continuous flow path to provide purification of liquids as a function of ion exchange resinous materials through which the contaminated liquid passes.

As will be shown in following paragraphs, containers 10 of the present invention permit insertion and removal of particulate material 12 without requiring removal of container 10 from the location of an operating system. Further, as will clearly be seen, container 10 may be removed from a system and easily replaced to provide decreased ion-exchange system non-operating time. This leads directly to an increase in savings in any liquid purification system under consideration. Also, container 10 is formed of a substantially low density material which is essentially chemically inert to a multiplicity of ion-exchange chemical reactions as well as environmental conditions which permits use of containers 10 under a wide range of conditions as well as maintaining ease in replacability of containers 10 when such becomes necessary.

In overall concept, modular container 10 includes housing structure or frame 14 having through opening 16 for passage of the contaminated liquid. Flow distribution member 18 is secured or positionally located in constrained relation to inner surface 20 of housing frame 14 to substantially equalize the flow of liquid through the particulate material. Additionally, containment or restraining members 22, 23 hold or maintain particulate material 12 within internal chamber 24 of housing frame 14 while permitting passage therethrough of the initially contaminated liquid being purified.

As is seen in FIG. 2, housing frame 14 includes through opening 16 passing between opposing housing frame ends 26 and 28. Through opening 16 provides a passage for contaminated liquid to pass therethrough as well as providing a volume opening for chamber 24 where particulate material 12 is stored during operation of a purification system utilizing container 10. As is seen in FIGS. 1 and 2, the geometrical contour of housing frame 14 is cylindrical in nature. However, although a cylindrical housing frame 14 has been found to be economical to produce, it will be understood that frame 14 and associated mating members may be made in a variety of shapes not restricted by the inventive concept as is herein detailed. One important aspect in the construction of a housing frame 14 is that it is formed of a low density, generally inert material with respect to a multiplicity of chemical reactions that may occur in a filtration or ion-exchange process. Housing frame 14 is formed of polyvinyl chloride (PVC) which includes important advantageous parameters such as relatively low weight, substantially inert to chemical reactions, and relatively stable under a wide variety of external enviornmental conditions.

Modular container or vessel 10 includes particulate insertion conduit 30 passing through a side wall of housing frame 14 clearly shown in FIG. 3. Insertion conduit 30 may be formed to threadedly engage the side wall of housing frame 14 or may be press fit therethrough. The method and mode of insertion of conduit 30 through the side wall of housing wall 14 is not important to the inventive concept of the invention as is herein detailed with the exception that conduit 30 pass completely through the side wall of frame 14 to provide a means whereby particulate material 12 may be inserted into chamber 24 of container 10. Additionally, the fitting of conduit 30 through the side wall of frame 14 is not important to the inventive concept with the exception that a tight seal be produced to prevent leakage of any liquid passing through container 10 as well as to prevent seepage of any of particulate material 12 external to housing frame 14.

In a similar manner, particulate removal conduit 32 is positionally located at a lower end of housing frame 14 to provide a means whereby exhausted particulate material 12 may be removed from chamber 24 within container 10. As was the case with particulate insertion conduit 30, removal conduit 32 may threadedly engage a side wall of housing frame 14, be press fit into the side wall or be fitted in some like manner to maintain a relatively tight seal at the interface between the container side wall and conduit 32.

Additionally, conduit caps or plugs 34 and 36 may be provided for conduits 30 and 32 respectively to provide a means whereby particulate material 12 and the liquid passing therethrough is essentially sealed from the external environment. Caps or plugs 34 and 36 may threadedly engage an internal diameter of respective conduits 30 and 32 and in some like manner may be adapted to provide a sealing mechanism for substances contained within and passing through chamber 24. In overall operation, prior to use of container 10 in a purifying system, cap or plug 34 may be removed from particulate insertion conduit 30 and particulate material 12 may be inserted therethrough by injecting material 12 through conduit 30 into chamber 24. After chamber 24 has been filled to the required volume capacity, plug 34 may be reinserted over or within conduit 30 and particulate material 12 is captured within container 10 and insolated from the external environment. Upon the need to remove particulate matter 12 from container 10, cap or plug 36 is removed from removal conduit 32 and particulate material 12 is drained from chamber 24 external to container 10. Upon completion of the draining process which may occur through gravity assist or application of a pressure differential means, cap or plug 36 is then reinserted on or within conduit 32 to provide a substantially hermetic seal.

Container 10 includes upper and lower flow distribution members 18 and 19 shown in FIGS. 2 and 3. Upper flow distribution or baffle member 18 distributes the incoming contaminated liquid flow in substantially equal amounts, when the liquid passes through particulate material 12, in a cross sectional area substantially normal to the incoming liquid flow as is seen in FIG. 3. Thus, the purpose of distribution member 18 is to provide dispersal of the downwardly directed contaminated liquid into a direction substantially radial of a gravity direction to provide passage of the liquid throughout all portion of particulate material 12 contained within chamber 24. Upper and lower distribution members 18, 19 includes a plurality of openings 38 passing through each distribution member. Openings 38 are randomly and well distributed throughout the surface of members 18 and 19 and are empiracally located to provide maximum flow with a minimal amount of resistance. Although random distribution of openings 38 has been found to be effective in equalizing the fluid or liquid flow throughout the projected area of distributors 18 and 19, it is believed that some non-random or predetermined positional location of openings 38 may also be found to provide the equalization of liquid flow characteristics. The importance of equalizing the flow of liquid through particulate matter 12 by distribution member 18 is clearly seen in order that certain portions of particulate matter 12 not be exhausted before other portions are fully utilized. Where contaminated liquid continually is passed through only a small portion of particulate material 12, it is evident that the portion through which the liquid continually passes will be exhausted prior to other volume portions.

Lower flow distribution member 19 permits the reduction of any liquid build-up in a particular area after the contaminated liquid has passed through the particular material 12 and thus reduces any liquid resistance which may have the affect of channeling incoming liquid into a particular region of chamber 24. As is seen, upper and lower flow distribution member 18 and 19 are formed in a disc shape geometric contour with through openings 38 passing from an upper to a lower surface to permit flow of liquid passing therethrough. Similar to housing frame 14, both upper and lower distribution members 18 and 19 are formed of polyvinyl chloride which has been found to be chemically inert to a wide variety of contaminated liquids as well as to the chemical reactions formed in the filtration and/or ionexchange systems. Additionally, disc members 18 and 19 have a diameter substantially equal to but slightly less than the diameter of through opening 16 in order that both members 18 and 19 may be slidably inserted within housing frame 14. In general, members 18 and 19 are shaped to slideably interface with internal surface 20 of housing frame 14.

Containment or restraining members 22 and 23 are formed of a fibrous material for interfacing on one surface with particulate material 12. On an opposing surface, members 22, 23 are bonded to an interfacing surface of distribution members 18 and 19 respectively. Restraining members 22 and 23 have a fibrous material density sufficient to substantially contained particulate material 12 within chamber 24 while at the same time permitting liquid flow to pass therethrough. One type of padding material which has been successfully used in Scotch-Brite general purpose pads which are manufactured by the 3M Company. A particular type of this brand being used with success is classified as Very Fine, Type A. Each of restraining members 22 and 23 may be fixedly secured to respective distribution members 18 and 19 through use of a silicone seal adhesive. Bonding in this manner has found the seal to be substantially inert to a multiplicity of contaminations which the assembly is subjected to.

In order to maintain distribution and containment members 18, 22 and 19, 23 in a predetermined positional relation within housing 10, a double pair of sleeve members 40, 42 and 44, 46 are provided. Referring now to sleeves 40 and 42 which are mounted on opposing sides of members 18 and 22, it is seen that they have an overall contour similar to that of through opening 16. Grooves or slots 48 and 50 passing through a side wall of each of sleeves 40 and 42 provide for sleeve resiliency. Sleeves 40 and 42 have an overall outer diameter substantially equal to but slightly less than through opening 16 so that each may be slidably inserted within housing frame 14. Each of sleeves 40 and 42 is contoured in the shape of an annular ring such that each sleeve member has an internal diameter substantially less than that of through opening 16. Thus each sleeve 40 and 42 provides a thickness surface area between its internal and external diameter upon which members 18 and 22 may be constrained.

In operation, sleeve 42 is inserted within through opening 16 of housing frame 14 to a predetermined depth dependent upon the volume size necessitated by the amount of particulate material 12 needed in a particular system. Sleeve 42 may then be bonded through gluing, or cementing to an internal wall of housing frame 14. One cement having been used successfully is methylethylketone, commonly referred to in the art as MEK. Once sleeve 42 is treated with the solvent cement or other bonding agent, it is positioned internal to housing frame 14 and is pressed firmly against inner wall surface 20 of frame 14. Bonded members 18 and 22 are then placed internal to frame 14 and rested on sleeve 42. Sleeve 40 is treated in a manner similar to that described for sleeve 42 and is inserted on top of members 18 and 22. After sleeve 40 has been fixedly secured in place to inner surface 20 of frame 14, it is clearly seen that members 18 and 22 are captured between sleeve members 40 and 42. Sleeve members 44 and 46 are inserted and bonded to inner surface 20 of frame 14 and secures members 23 and 19 therebetween in a manner similar to that described for sleeves 40 and 42. Sleeve members 40, 42, 44 and 46 are formed of polyvinyl chloride (PVC) to provide the necessary chemical parameters and resiliency necessary for operation of these components.

In order to form a total enclosure for a housing frame 14 a pair of cover members 52 and 54 shown in FIGS. 1, 2 and 3 are slidably inserted over an external surface of frame 14. Upper cover or cap member 52 includes inlet conduit 56 insertably mounted thereto through threaded engagement, welding, or some like technique. Cap 52 after being slidably inserted over an outer wall of frame 14 is sealed thereto through welding joint 58 passing around a periphery of the outer wall of frame 14. In general, upper and lower covers 52 and 54 are formed of polyvinyl chloride. PVC welding rod, preferably 3/16 inches in diameter has been used to thermally fuse covers 52, and 54 to the outer wall of frame 14 through use of nitrogen gas under an elevated temperature utilizing well known techniques in the welding art. Welding in this manner essentially provides a hermetic seal for the internal portions of modular container 10. Use of PVC as a welding rod includes the advantage of not having a degradation of any of the components associated with the overall modular container 10.

It will be noted that lower cover member 54 is similarly slided over an outer wall of container 10 at a lower portion thereof. In the embodiments shown in FIGS. 1, 2 and 3 it is seen that lower cover member 54 includes lower cover opening 60 passing through a side wall thereof which is aligned with conduit opening 62 formed in a side wall of housing frame 14 through which liquid outlet conduit 64 passes. In this manner, liquid having passed through particulate material 12 is exited or transported from internal to housing frame 14 to an external environment. Additionally, lower cover 54 is welded to an external surface of housing frame 14 in a similar manner to that of upper cover 52.

An embodiment of the invention is shown in FIG. 4 where upper cover 52' and lower cover 54' are not of the slip cover type shown in FIGS. 1, 2 and 3. Upper cover 52' includes a groove which is contoured to accept the side wall of housing frame 14 therein. Screws 66 threadedly engage and secure members 52' and 54' to the side wall of housing frame 14 as is shown. Additionally, each of caps 52' and 54' are sealed to housing frame 14 through weld joint 68 formed in a manner similar to the weld joint for upper and lower cover members 52 and 54 as previously described.

Although this invention has been described in connection with specific forms and embodiment thereof, it will be appreciated that various modifications other than those discussed above may be resorted to without departing from the spirit or scope of the invention. For example, equivalent elemental structures may be substituted for those specifically shown and described, certain features may be used independently of other features, and in some cases, parts may be reversed, all without departing from the spirit or scope of the invention as defined in the appended claims.

What is claimed is:

1. A modular container for capturing ion-exchange particulare material through which liquid passes, comprising:
   a. housing means having a through opening for passage of said liquid;
   b. flow distribution means secured to an inner surface of said housing means for substantially equalizing flow of said liquid through said particulate material within said container independent of said particulate material positional locations, said flow distribution means being a pair of disc members each of which has a plurality of openings constructed and arranged randomly without any predetermined pattern taken with respect to the surface contour of said discs and passing therethrough for equalizing said flow of said liquid in a plane normal to a path of said flow of said liquid through said housing means, said disc members being mounted internal said housing means and on opposing ends thereof; and c. containment means for constraining said particulate material within a chamber of said housing, said containment means being porous to provide passage of liquid therethrough, said containment means being a fibrous padding member mounted in secured fashion to said flow distribution means on one surface thereof.

2. The modular container as recited in claim 1 where said housing means is formed of polyvinyl chloride.

3. The modular container as recited in claim 1 including cover means secured to opposing ends of said housing means, said cover means having conduit means for transporting said liquid internal said housing means, said cover means including a pair of cap members slideably interfaced over a portion of opposing ends of said housing means, one of said cap members having an opening alignable with a passage formed in said housing for egress of said liquid.

4. The modular container as recited in claim 3 where each of said cap members are welded to said outer wall of said housing means to form a substantially hermetic seal.

5. The modular container as recited in claim 3 where at least one of said cap members is formed of polyvinyl chloride.

6. The modular container as recited in claim 1 where said housing means is cylindrical in contour, said housing means including cover means for matingly engaging said housing means on opposing ends of said through opening.

7. The modular container as recited in claim 1 including means for inserting said particulate material into said chamber of said housing means, said insertion means including at least one conduit element passing through a wall of said housing means.

8. The modular container as recited in claim 7 including means for removing said particulate material from said chamber of said housing means, said removal means including at least one conduit element passing through a wall of said housing means.

9. The modular container as recited in claim 1 where said containment means includes fibrous material means, said fibrous material means for interfacing with said particulate material and having a density sufficient to substantially contain said particulate material within said housing means.

10. The modular container as recited in claim 9 where said fibrous material means is secured to said flow distribution means.

11. The modular container as recited in claim 10 where said fibrous material is bonded to a lower surface area of said flow distribution means.

12. The modular container as recited in claim 1 including means for positionally mounting said flow distribution means and said containment means within said housing means, said positional mounting means forming at least one resilient sleeve member having a discontinuous wall for mounting to an inner surface of said housing means.

13. The modular container as recited in claim 12 where said resilient sleeve means includes at least one pair of sleeve members, said flow distribution means and said containment means being mounted between said sleeve members.

14. The modular container as recited in claim 13 where said sleeve members are formed of polyvinyl chloride.

15. The modular container as recited in claim 13 where said containment means is formed of a Scotch-Brite padding material.

* * * * *